US012673486B2

(12) United States Patent　　　　　　(10) Patent No.:　US 12,673,486 B2
Vasic et al.　　　　　　　　　　　　　　(45) Date of Patent:　　Jul. 7, 2026

(54) APPARATUS AND METHOD FOR THE PRODUCTION OF THREE-DIMENSIONAL SCREEN-PRINTED WORKPIECES

(71) Applicant: Exentis Knowledge GmbH, Stetten Ag (CH)

(72) Inventors: Srdan Vasic, Stetten (CH); Ralf P. Brammer, Stetten (CH)

(73) Assignee: Exentis Knowledge GmbH, Stetten Ag (CH)

( * ) Notice: Subject to any disclaimer, the term of this patent is extended or adjusted under 35 U.S.C. 154(b) by 505 days.

(21) Appl. No.: 17/604,731

(22) PCT Filed: Apr. 15, 2020

(86) PCT No.: PCT/EP2020/060499
§ 371 (c)(1),
(2) Date: Oct. 18, 2021

(87) PCT Pub. No.: WO2020/212368
PCT Pub. Date: Oct. 22, 2020

(65) Prior Publication Data
US 2022/0203670 A1　　Jun. 30, 2022

(30) Foreign Application Priority Data
Apr. 18, 2019　(EP) ..................................... 19170346

(51) Int. Cl.
*B41F 23/04*　　　(2006.01)
*B33Y 10/00*　　　(2015.01)
(Continued)

(52) U.S. Cl.
CPC .......... *B41F 23/0443* (2013.01); *B41F 15/08* (2013.01); *B41F 15/18* (2013.01);
(Continued)

(58) Field of Classification Search
CPC ........ B41F 23/005; B41F 15/18; B41F 15/08; B41F 23/0443
See application file for complete search history.

(56) References Cited

U.S. PATENT DOCUMENTS

| 4,366,542 | A | 12/1982 | Anselrode |
| 4,930,413 | A | 6/1990 | Jaffa |
(Continued)

FOREIGN PATENT DOCUMENTS

| CN | 2511482 Y | 9/2002 |
| CN | 2770973 Y | 4/2006 |
(Continued)

OTHER PUBLICATIONS

Chinese First Office Action and Search Report for Corresponding Chinese Application No. 202080029612.7 issued Oct. 8, 2022.
(Continued)

*Primary Examiner* — Stella K Yi
(74) *Attorney, Agent, or Firm* — MARSHALL, GERSTEIN & BORUN LLP

(57) ABSTRACT

Apparatus for producing three-dimensional screen-printed workpieces, in particular 3D screen printing machine, with at least one printing device for the layer-by-layer production of at least one screen-printed workpiece in a plurality of printing operations and with at least one drying device for a screen-printed workpiece, wherein the drying device is designed as a drying path for the continuous drying of screen-printed workpieces.

17 Claims, 4 Drawing Sheets

(51) Int. Cl.

| | |
|---|---|
| *B33Y 30/00* | (2015.01) |
| *B41F 15/08* | (2006.01) |
| *B41F 15/18* | (2006.01) |
| *B41F 23/00* | (2006.01) |

(52) U.S. Cl.

CPC ............. *B41F 23/005* (2013.01); *B33Y 10/00* (2014.12); *B33Y 30/00* (2014.12); *B41P 2215/114* (2013.01)

(56) References Cited

U.S. PATENT DOCUMENTS

| | | |
|---|---|---|
| 7,418,901 B2 | 9/2008 | Sakaida et al. |
| 8,371,216 B2 | 2/2013 | Chisholm et al. |
| 10,278,237 B2 | 4/2019 | Krause et al. |
| 10,369,779 B2 | 8/2019 | Bauer |
| 10,589,514 B2 | 3/2020 | Hirukawa et al. |
| 10,986,736 B2 | 4/2021 | Hawkins et al. |
| 2004/0170459 A1 | 9/2004 | Taylor et al. |
| 2008/0199240 A1 | 8/2008 | Verlinden et al. |
| 2009/0308860 A1 | 12/2009 | Baccini |
| 2011/0297020 A1 | 12/2011 | Tanaka |
| 2012/0034382 A1 | 2/2012 | Baccini et al. |
| 2012/0048132 A1 | 3/2012 | Baccini et al. |
| 2012/0211155 A1 | 8/2012 | Wehning et al. |
| 2013/0102103 A1 | 4/2013 | Cellere et al. |
| 2013/0192481 A1 | 8/2013 | Abe et al. |
| 2014/0065194 A1 | 3/2014 | Yoo et al. |
| 2015/0027328 A1 | 1/2015 | Gray |
| 2015/0147585 A1 | 5/2015 | Schwarze et al. |
| 2016/0121599 A1 | 5/2016 | Bauer |
| 2017/0217152 A1 | 8/2017 | Cempa et al. |
| 2018/0162118 A1 | 6/2018 | Hirukawa et al. |
| 2018/0275634 A1 | 9/2018 | Mcfarland et al. |
| 2019/0118525 A1 | 4/2019 | Mantani et al. |
| 2022/0176628 A1 | 6/2022 | Vasic et al. |

FOREIGN PATENT DOCUMENTS

| | | |
|---|---|---|
| CN | 101811389 A | 8/2010 |
| CN | 102057462 A | 5/2011 |
| CN | 202029495 U | 11/2011 |
| CN | 102325654 A | 1/2012 |
| CN | 102648095 A | 8/2012 |
| CN | 102909941 A | 2/2013 |
| CN | 103269856 A | 8/2013 |
| CN | 104124306 A | 10/2014 |
| CN | 104339825 A | 2/2015 |
| CN | 105882122 A | 8/2016 |
| CN | 106029382 A | 10/2016 |
| CN | 106183375 A | 12/2016 |
| CN | 106455170 A | 2/2017 |
| CN | 106965579 A | 7/2017 |
| CN | 107073927 A | 8/2017 |
| CN | 206870570 U | 1/2018 |
| CN | 206870572 U | 1/2018 |
| CN | 107709014 A | 2/2018 |
| CN | 108878334 A | 11/2018 |
| CN | 208035634 U | 11/2018 |
| CN | 109435437 A | 3/2019 |
| DE | 102006031189 A1 | 1/2008 |
| DE | 102008033382 A1 | 12/2009 |
| DE | 112010003188 T5 | 5/2012 |
| DE | 202013004745 U1 | 8/2014 |
| EP | 2662905 A1 | 11/2013 |
| EP | 2711183 A1 | 3/2014 |
| EP | 3116287 A1 | 1/2017 |
| EP | 3305525 A1 | 4/2018 |
| JP | H0550579 A | 3/1993 |
| JP | H0740525 A | 2/1995 |
| JP | 2001328233 A | 11/2001 |
| JP | 2002225221 A | 8/2002 |
| JP | 2003002497 A | 1/2003 |
| JP | 2006187912 A | 7/2006 |
| JP | 2007260993 A | 10/2007 |
| JP | 2008142949 A | 6/2008 |
| JP | 2016175362 A | 10/2016 |
| JP | 2018202691 A | 12/2018 |
| KR | 20100006931 U | 7/2010 |
| WO | WO-2014/187567 A2 | 11/2014 |
| WO | WO-2015/163765 A1 | 10/2015 |
| WO | WO-2016/188930 A1 | 12/2016 |
| WO | WO-2017/034951 A1 | 3/2017 |

OTHER PUBLICATIONS

Chinese First Office Action and Search Report for Corresponding Chinese Application No. 202080029594.2 issued Oct. 8, 2022.

Chinese First Office Action and Search Report for Corresponding Chinese Application No. 202080029592.3 issued Sep. 13, 2022.

Chinese First Office Action and Search Report for Corresponding Chinese Application No. 202080029651.7 issued Sep. 27, 2022.

Chinese First Office Action and Search Report for Corresponding Chinese Application No. 202080029545.9 issued Sep. 22, 2022.

Laxxon Medical: "3D Screen Printing Animation", Youtube, Apr. 17, 2019, p. 1, XP054979839, retrieved from the Internet: <URL: https://www.youtube.com/watch?v=cvt02W17hJY/> (2019).

Fraunhofer IFAM Dresden, "Additive Fertigung mit 3D-Siebdruck", Mar. 4, 2019, p. 1 pp., Retrieved from the Internet: <URL:https://www.youtube.com/watch?v=d7sx4UK6if8/> XP054979817.

Exentis Group AG, "3D Mass Customization", Nov. 24, 2017, p. 1 pp., Retrieved from the Internet: <URL:https://www.youtube.com/watch?v=hlmJkbsPtRY/> XP054979818.

International Search Report and Written Opinion, corresponding International Application No. PCT/EP2020/060498, mailing date May 28, 2020.

International Search Report and Written Opinion, corresponding International Application No. PCT/EP2020/060499, mailing date May 28, 2020.

International Search Report and Written Opinion, corresponding International Application No. PCT/EP2020/060500, mailing date May 28, 2020.

International Search Report and Written Opinion, corresponding International Application No. PCT/EP2020/060501, mailing date May 28, 2020.

International Search Report and Written Opinion, corresponding International Application No. PCT/EP2020/060502, mailing date May 28, 2020.

Chartrand & Zhang, "A First Course in Graph Theory," Ch. 1.2, Dover Publications 2012.

Chinese Patent Application No. 202080029594.2, Second Office Action and Search Report, dated May 29, 2023.

Chinese Patent Application No. 202080029612.7, Second Office Action and Search Report, dated May 30, 2023.

APPARATUS AND METHOD FOR THE PRODUCTION OF THREE-DIMENSIONAL SCREEN-PRINTED WORKPIECES

CROSS-REFERENCE TO RELATED APPLICATIONS

This application is a U.S. National stage of International Patent Application No. PCT/EP2020/060499 filed Apr. 15, 2020, which claims the benefit of European Patent Application No. 19170346.1 filed Apr. 18, 2019, the entire disclosures of which are each incorporated herein by reference in their entireties.

BACKGROUND

Field of the Disclosure

The present invention relates to an apparatus for producing three-dimensional screen-printed workpieces. Likewise, the present invention relates to a method for producing three-dimensional screen-printed workpieces.

Brief Description of the Related Technology

A system for producing three-dimensional screen-printed workpieces is known from the prior art in WO 2014/187567 A2. In this system design, a printing station is provided into which a printing table is arranged to be moved in and out. Thereby, a printing table can be moved into the printing device for printing a layer and moved out of the printing device and into a drying device positioned adjacent to the printing station for drying. Finally, according to WO 2014/187567 A2, it is possible to provide two drying devices positioned adjacent to the printing station. In this case, two printing tables are also provided, which are moved alternately to each other into the printing station and into the respectively associated curing unit for drying.

Despite the arrangement of a plurality of drying stations, however, insufficient utilization of the printing station can occur during operation. This is due to the fact that drying a printed layer within a drying station takes more time than printing a layer. The productivity of the system is therefore limited.

SUMMARY

Against the background set out above, the task of the present invention was to specify an apparatus for the production of three-dimensional screen-printed workpieces, which ensures increased productivity and, at the same time, high operational reliability. Likewise, the task was to disclose a method for the production of three-dimensional screen-printed workpieces.

With respect to the apparatus, this task has been solved by the subject-matter of claim 1. A method according to the invention is the subject of claim 15. Advantageous embodiments are subject of the dependent claims and are explained below.

According to the invention, an apparatus for the production of three-dimensional screen-printed workpieces is provided. The device is in particular a 3D screen printing machine, preferably an automated 3D screen printing machine.

The apparatus according to the invention has at least one printing device for the layer-by-layer production of at least one screen-printed workpiece in a plurality of printing operations and at least one drying device for a screen-printed workpiece. According to the invention, the drying device is designed as a drying path for the continuous drying of screen-printed workpieces.

Accordingly, numerous screen-printed workpieces or partially finished screen-printed products can be continuously fed through the drying device. It is clear that such a drying path can also be designed for the continuous drying of workpiece carriers. This permits an overall continuous production process for a plurality of screen-printed workpieces or with a plurality of workpiece carriers on which screen-printed workpieces can be arranged. Both printing and drying can be carried out substantially without interruption by means of a continuous drying passage, which can increase the overall productivity of the apparatus.

In the present context, three-dimensional screen printing is particularly preferably understood to mean an additive manufacturing process in which a powder-based suspension is transferred to a substrate through a fixed printing mask with the aid of a squeegee and dried. This procedure can be repeated several times until the respective desired component height or component shape is achieved. In a final process step, the component produced in this way can be sintered. Thereby, a screen-printed workpiece may be produced.

In the present context, the term "screen-printed workpiece" can preferably be understood to mean workpieces that are to be or have been subjected to a sintering step. This applies in particular to workpieces made of a metal, a ceramic, a glass material and/or a plastic material. Alloys of steel, nickel, copper, titanium and/or ceramic alloys are particularly suitable for this purpose.

Printed products made of plastic materials can be excluded or included by the designation "three-dimensional screen-printed workpiece". In particular, there is also the possibility of subjecting printed workpiece layers made of plastic material to a sintering step.

According to a preferred embodiment the apparatus comprises at least one workpiece carrier for at least one screen-printed workpiece. Furthermore, the printing device can be equipped with at least one printing table plate, which is formed separately from the workpiece carrier and on which the workpiece carrier can be positioned for carrying out a printing process. Finally, the workpiece carrier can, between two successive printing processes for a screen-printed workpiece, be detachable from the printing table plate for drying the screen-printed workpiece.

A screen-printed workpiece may thus be produced in layers, and between the printing processes for a screen-printed workpiece, the respective workpiece carrier can be released from the printing table plate. This allows the individual layers of a screen-printed workpiece to be dried between two successive printing processes in a position released from the printing table plate or fed through the drying device for the continuous drying passage, respectively.

During operation, the printing table plate can thus, in a preferred manner, be loaded with different workpiece carriers so that the capacity utilization of the printing device can be increased. In particular, the downtimes of the printing device can be reduced to the times required for changeover or loading with a new workpiece carrier. The overall productivity of the system can be further improved in this way. This results in particular suitability of the device for use in mass production.

In a preferred manner, the apparatus can be designed so that the printed material or the workpiece or component to be printed remains on the workpiece carrier between the printing of different layers. This can reduce the risk of damage to the printed material, in particular to a workpiece or component that has not yet been completely printed.

In a further preferred manner, the apparatus can be designed to generate workpiece or component accuracies of up to 50 μm, particularly preferably of up to 30 μm, especially of up to 20 μm, more preferably of up to 10 μm. Workpiece or component accuracy can be understood to mean the accuracy of an external and/or, if applicable, internal geometry of a workpiece or component. In particular, these can be accuracies of a finished workpiece or component. Such accuracies can refer to dimensions transverse to a print build direction, i.e. along an X-axis and/or a Y-axis. Likewise, such accuracies can refer to dimensions in a print build direction, i.e. along a Z-axis. The preceding axis designations can correspond in particular to the axis designations of an apparatus claimed in the present case, which will be discussed in more detail below.

According to a further preferred embodiment, the apparatus may be designed to generate printing heights, in particular workpiece or component heights, of up to 200 mm, of up to 100 mm, in particular of up to 75 mm, preferably of up to 50 mm, further preferably of up to 30 mm, still further preferably of up to 20 mm, still further preferably of up to 10 mm. Furthermore, the apparatus can be designed to generate printing heights, in particular workpiece or component heights, of less than 200 μm, in particular of less than 100 μm, in particular of less than 50 μm, more preferably of less than 25 μm.

In a further preferred manner, the apparatus may be configured to produce printed layers having a thickness of less than 1 mm, particularly less than 0.5 mm, preferably less than 0.25 mm, more preferably less than 0.2 mm, still more preferably less than 0.1 mm, particularly preferably less than 0.05 mm or less than 0.025 mm.

In an even more preferred manner, the apparatus can be designed to produce components or workpieces with a number of up to 1000 layers, in particular up to 750 layers, preferably up to 500 layers or up to 250 layers. In this case, a screen-printed workpiece can have at least two printing layers, in particular more than two printing layers.

According to a preferred embodiment, a transport device can be provided for the automated transport of at least one workpiece carrier, in particular for a plurality of workpiece carriers. In this case, the transport device can preferably have a transport circuit for the automated transport of the at least one workpiece carrier and/or be designed as a transport circuit. Likewise, the transport device can be set up for automated transport in a circuit between the printing device and at least one position spaced apart from the printing device and/or the printing table plate. By means of such a transport circuit, a particularly favorable material flow within the apparatus can be accomplished, so that the overall productivity of the apparatus can be improved. Manual handling of individual workpiece carriers can thus be completely avoided or reduced to a minimum.

According to a further preferred embodiment, the transport device and/or the transport circuit can be designed to be multi-lane at least in sections and/or single-lane at least in sections. In this way, different transport capacities can be realized for different transport sections.

According to a further preferred embodiment, the transport device can be formed at least in sections by a conveyor, in particular a belt conveyor. It can be further advantageous if the transport device and/or the transport circuit is formed by a fiberglass-teflon-coated fabric belt or by several of such fabric belts. A transport device or transport circuit designed in this way ensures a high degree of operational reliability.

According to a further preferred embodiment, the transport device can have a plurality of transport sections running at an angle to one another. Furthermore, the transport device can have at least one corner transfer unit, in particular with conveyor belts running transversely to one another. In this way, the course of the transport device can be flexibly adapted to the respective requirements of the device or selected in a suitable manner for installation.

According to one embodiment of the present invention, a positioning and/or handling device can be provided for pre-positioning a workpiece carrier on the printing table plate, in particular for pre-positioning with an accuracy tolerance of +/−500 μm regarding the position and/or of up to +/−5° regarding the orientation or rotational position of the workpiece carrier.

In this way, it is possible to reposition the workpiece carrier relatively precisely on the printing table plate or to reposition it in preparation for further steps.

Furthermore, a positioning and/or handling device can be designed for pre-positioning a workpiece carrier on the printing table plate with an accuracy tolerance of +/−1000 μm regarding the position and/or of up to +/−10° regarding the orientation or rotational position of the workpiece carrier.

Likewise, a positioning and/or handling device can be designed for pre-positioning a workpiece carrier on the printing table plate with an accuracy tolerance of +/−200 μm regarding the position and/or of up to +/−2° regarding the orientation or rotational position of the workpiece carrier.

Likewise, a positioning and/or handling device can be configured for pre-positioning a workpiece carrier on the printing table plate with an accuracy tolerance of +/−100 μm regarding the position and/or of up to +/−1° regarding the orientation or rotational position of the workpiece carrier.

Likewise, a positioning and/or handling device can be configured for pre-positioning a workpiece carrier on the printing table plate with an accuracy tolerance of +/−50 μm regarding the position and/or of up to +/−0.5° regarding the orientation or rotational position of the workpiece carrier.

Likewise, a positioning and/or handling device can be configured for pre-positioning a workpiece carrier on the printing table plate with an accuracy tolerance of +/−25 μm regarding the position and/or of up to +/−0.25° regarding the orientation or rotational position of the workpiece carrier.

The above accuracy ranges refer in particular to positions along a plane transverse to the build direction of the screen-printed workpiece (X-direction and Y-direction) or to the rotational position about an axis running in the build direction (Z-axis).

According to one embodiment of the present invention, the apparatus can be equipped with a positioning and/or handling device by which the workpiece carrier can be positioned on the printing table plate in an automated and/or defined manner. By means of such a positioning and/or handling device, the positioning accuracy of the workpiece carrier on the printing table plate can be ensured and the need for manual handling can be avoided. In particular, it is possible to reposition the workpiece carrier precisely or relatively precisely by means of the positioning and/or handling device.

Such automated and/or defined positioning by a positioning and/or handling device can be a pre-positioning, in particular with the preceding accuracy specifications. After such a pre-positioning, a fine positioning can also take place, which will be discussed in the following. Fine positioning can also be performed by a positioning and/or handling device.

The possibility of precise repositioning of the workpiece carrier can be particularly advantageous for printing subsequent layers. By means of a positioning and/or handling device, the workpiece carrier can first be arranged on the printing table plate at a specific position or in a specific orientation. After a printing process has taken place in this position or orientation of the workpiece carrier, the workpiece carrier can be released from the printing table plate for drying. Precise repositioning of the workpiece carrier on the printing table plate can now be carried out by the positioning and/or handling device, if necessary with fine positioning following pre-positioning.

In other words, the workpiece carrier can be positioned on the printing table plate according to the previous print. Deviations in the position and/or alignment of the workpiece carrier on the printing table plate between two successive printing processes can thus be avoided.

Preferably, the positioning and/or handling device can be configured to detect the position of the workpiece carrier. The repositioning of a workpiece carrier on the printing table can be carried out in this way with particularly high accuracy. In particular, the position detection of the workpiece carrier can influence the repositioning process and thus promote correct positioning and/or alignment of the workpiece carrier on the printing table plate.

Position detection of the workpiece carrier by the positioning and/or handling device can take place both in an initial position and/or in an end position. Starting and end positions can be provided, for example, on the printing table plate or also in a feed area of the printing table plate or in a removal area of the printing table plate.

Preferably, the positioning and/or handling device can be designed as part of the transport device. Thus, a high degree of integration of the different apparatus components and thus also a high degree of automation can be realized, resulting in a particularly advantageous suitability for the mass production of 3D screen-printed workpieces.

According to a further embodiment, the positioning device can have a conveyor, in particular a belt conveyor. The conveying means and/or the belt conveyor can preferably extend into the printing table plate and/or be recessed into the printing table plate and/or be lowerable and/or raisable relative to the printing table plate. Such a conveyor can transport workpiece carriers up to the printing table plate with only little effort and relatively high process reliability. By lowering the conveyor or the belt conveyor, the workpiece carrier can be deposited on the printing table plate. By raising the conveyor or the belt conveyor, the workpiece carrier can be lifted off the printing table plate again and transported away from it.

Furthermore, the handling device can also be a pick-and-place device. The handling device can also be designed as a handling robot. Such handling devices ensure high accuracy and flexibility in operation.

Overall, the automated handling of a workpiece carrier by the positioning and/or handling device may ensure further improved productivity of the apparatus. Manual operation of the apparatus can be reduced to a minimum or completely avoided by the provision of a positioning and/or handling device. The risk of impairments to the production process due to operating errors is reduced in this way.

According to a further embodiment, the positioning and/or handling device can be designed for loading the printing table plate with workpiece carriers from several sides. It is possible for a positioning and/or handling device to be arranged on each of several sides of the printing table plate, in particular for loading the printing table plate from different sides. This can further increase the utilization of the printing device, which can improve productivity.

According to one embodiment of the apparatus according to the invention, an alignment device is provided by which the workpiece carrier can be aligned and/or positioned in a defined manner on the printing plate. In this way, the correct position of the workpiece carrier on the printing table plate can be ensured for two successive printing processes. The generation of a desired component geometry can thus be reliably achieved. In particular, it can be ensured in this way that a workpiece carrier is positioned on the printing table plate with sufficient repeat accuracy until completion of the entire printing process, including printing of multiple printing layers. Process reliability is improved as a result.

An alignment device can be formed, for example, by a mechanical positioning element and/or by at least one stop. In this way, the positional accuracy of the workpiece carrier on the printing table plate can be ensured with particularly little effort. It is also possible for the alignment device to be formed by a positioning and/or handling device described above. An alignment device can advantageously ensure pre-positioning with the aforementioned accuracy specifications for pre-positioning.

The alignment device can furthermore be designed as part of the transport device and/or the printing device, whereby the integration of the device, in particular of the different devices, can be further increased. Preferably, this allows the degree of automation to be increased and thus productivity to be improved.

In a further preferred manner, the transport device can run at least in sections along at least two planes, in particular two vertical planes and/or two planes running one above the other in the vertical direction. The flexibility of the course of the transport device can be improved in this way. A lifting device, in particular a lift arrangement, can be provided between the two levels of the transport device, preferably a plurality of lifting devices. The transport device can further be designed at least in sections with a height gradient, in particular a height gradient extending between two levels of the transport device. Such a height gradient can preferably be formed on a return section to the printing device. In this way, a lower level can be targeted in the return flow. The height gradient allows the influence of gravity to be used at least in sections for transporting workpiece carriers.

According to a further preferred embodiment, the apparatus according to the invention can be equipped with at least one drying device for a screen-printed workpiece. By means of such a drying device, after the application of a printing layer, a reliable drying of the last printing layer can be carried out in order to then apply the next printing layer to the screen-printed workpiece.

The drying path is preferably designed as part of the transport device so that the integration of the apparatus can be further improved. In particular, the transport device can run through the drying device so that manual handling of the workpiece carriers can be completely avoided.

In a further preferred manner, the workpiece carrier can be moved through the drying device independently of the printing table plate, in particular it can be moved through the drying device automatically. Accordingly, it is intended that by releasing the workpiece carrier from the printing table plate after printing, the workpiece carrier is moved into the drying device without the printing table plate and thus only the workpiece carrier is exposed to any temperature loads.

The printing table plate thus always remains outside the drying device and is not subjected to any temperature loads, which means that the printing table plate itself or peripheral components for the printing table plate are subject to less wear or can be implemented with relatively little design effort.

According to a further preferred embodiment, the workpiece carrier can be automatically moved through the drying device and/or moved through the drying device at a variably adjustable speed. The automated traversability ensures a particularly low handling effort for the workpiece carrier. Due to the variably adjustable speed for moving the workpiece carrier through the drying device, the drying intensity for the respective screen-printed workpieces can be adapted with only little effort. Likewise, the adjustment of the traversing speed can be adapted to the number of workpiece carriers in circulation or to the printing speed in the printing device, so that an essentially uninterrupted or quasi-continuous production process can be ensured within the device.

It can be further advantageous if the drying device is configured for drying at least one screen-printed workpiece by means of convection and/or thermal radiation, in particular infrared thermal radiation. By using different heat transfer mechanisms, the drying process can be flexibly adapted to the respective operating conditions.

In a preferred manner, the drying device has a plurality of convection and/or heat radiation units. Furthermore, in an advantageous manner, the active length of the drying device can be variably adjusted, preferably by activating and/or deactivating at least one convection and/or heat radiation unit. Accordingly, the heat input into a screen-printed workpiece can be adapted by adjusting the active length of the drying device depending on the operating conditions. The activation or deactivation of convection and/or heat radiation units can be accomplished with little effort. The overall flexibility of the device is improved in this way.

The drying device can in particular be a drying tunnel through which the workpiece carriers are automatically conveyed for drying. Convection and/or heat radiation units can be provided within the drying tunnel. The active length of the drying tunnel can be variably adjustable.

According to a further preferred embodiment, the number of drying devices can be equal to or less than the number of printing devices. For example, several printing devices can be assigned to a single drying device, so that workpiece carriers are guided from several printing devices to a single drying device. In this way, a relatively high printing capacity can be realized and a large drying volume can be provided within the drying device, for example by a relatively high drying intensity.

It is also possible for the number of drying devices to be greater than the number of printing devices. In this way, a particularly high utilization of printing equipment can be ensured. The risk of downtimes or dead times for individual printing devices can be reduced in this way.

It is also possible for several printing devices to be provided, with each printing device being assigned at least one drying device and/or each drying device being assigned to at least one printing device. The movement sequences of individual workpiece carriers can be suitably defined in this way and adapted to the respective application.

According to a further preferred embodiment, a plurality of workpiece carriers can be provided, each of which can be positioned within the printing device for carrying out a printing process. For this purpose, the workpiece carriers can be transported automatically by the transport device, in particular simultaneously along different sections of the transport device. The productivity of the apparatus can be further improved by this.

At least one of the workpiece carriers can be marked individually and/or traceably. Preferably, all workpiece carriers are marked individually and/or traceably. Such marking enables all process steps relating to a workpiece carrier to be traced and/or automatically recorded or documented.

Different stations of the device, for example the printing device and/or a cooling or drying device, can recognize the respective workpiece carrier on the basis of an identification and store the process steps carried out in relation to the workpiece carrier. Each process sequence carried out in relation to a workpiece carrier can thus be traced in a higher-level data structure. This can be particularly advantageous in the case of different printing devices, when using a common drying device.

It is possible, for example, for different workpieces or workpiece types to be produced at different printing stations, possibly with different material formulations and/or layer thicknesses and/or printing screens. The material formulations and/or layer thicknesses used in each case can in turn influence the required drying process, so that the drying process can be individually adapted or alternately changed for drying different screen-printed workpieces on different workpiece carriers. In addition to operational reliability, operational flexibility is thus also improved by appropriate marking of the workpiece carriers.

According to a further preferred embodiment, the at least one workpiece carrier is provided with at least one marking, preferably with a plurality of markings. Such a marking can preferably be identifiable electronically, in particular by RFID, optically and/or by camera. Process reliability can be further improved in this way, since the ongoing or repetitive acquisition of information relating to the respective workpiece carrier is simplified via such marking.

According to a further preferred embodiment, the at least one workpiece carrier is provided with at least one marking for individual identification and/or individual tracking of the workpiece carrier, in particular with an individual identification for tracking. Accordingly, such a marking can have an electronic and/or optical identifier, by means of which the respective workpiece carrier can be tracked.

According to a further preferred embodiment, the at least one workpiece carrier is provided with at least one marking for position detection, in particular a plurality of markings for position detection. The marking for position detection is preferably a marking via which the position and/or orientation of the workpiece carrier can be detected. In particular, such a marking is optically detectable. Preferably, two markings for position detection can be provided per workpiece carrier, whereby the position and/or orientation of the respective workpiece carrier can be determined with a high degree of certainty. In particular, one marking in each case can be detected by a respective associated detection device, in particular camera, which will be described in more detail below. For example, two cameras can be provided, each of which is configured to detect one of the markings on a workpiece carrier to be detected.

According to a further preferred embodiment, the workpiece carrier has a marking that can be detected by a position detection device and/or by a positioning and/or handling device and/or a transport device. The detection reliability or detection speed can be improved in this way. Both the handling of the workpiece carrier and the fine adjustment of the position and alignment of the printing table plate or upper printing mechanism can be simplified in this way.

According to a further preferred embodiment, at least one storage device, in particular an input and/or output storage, is provided, which can be designed for temporary storage and/or automated pickup and/or output of at least one workpiece carrier, preferably a plurality of workpiece carriers. By means of such a storage device, individual workpiece carriers can be selectively discharged from the production process and/or reintroduced into it, for example, in order to await further runs of other workpiece carriers within the apparatus. For example, workpiece carriers can be diverted out of the production process and temporarily stored in the storage device until a screen change has taken place in the printing device. Once the screen has been changed, the respective workpiece carrier can then be reintroduced into the production process from the storage device and then fed into the printing device equipped with the new screen at the desired time. Production flexibility and efficiency can be improved in this way.

In a further preferred embodiment, the transport device can be designed for the automated transport of the at least one workpiece carrier, preferably for a plurality of workpiece carriers, between the printing device and the cooling device and/or between the drying device and the input and/or output storage and/or between the input and/or output storage and the printing device. Such a transport connection between the individual devices or stations of the apparatus can in particular form a circuit. Such a transport circuit can ensure a particularly advantageous material flow between the printing device, the drying device and/or the storage device. The need for manual handling of individual workpiece carriers can thus be reduced to a minimum or avoided completely.

According to a further preferred embodiment, the transport device and/or the transport circuit can lead through the drying device in multiple lanes. Furthermore, in the transport device and/or in the transport circuit, the return from the drying device to the printing device can be designed as a single lane. Fewer lanes can be provided in the transport section leading back from the drying device to the printing device than in the transport section leading through the drying device. In this way, a large drying capacity can be provided with a relatively short length of the drying device.

Preferably, the transport device or the transport circuit can have a bridging section for bridging the printing device. The transport circuit can be designed to allow a workpiece carrier to pass through the drying device several times, in particular without passing through the printing device. Accordingly, a workpiece carrier can be passed through the drying device several times before being returned to the printing device in order to ensure a high degree of drying. At the same time, unnecessary passing through the printing device by workpiece carriers can be avoided, which further improves productivity.

According to a further preferred embodiment, an inspection area can be provided adjacent to a printing area of the printing device, in particular for inspecting a screen-printed workpiece and/or a workpiece carrier and/or for inspecting a relative position and/or relative alignment of a workpiece carrier on the printing table plate and/or for inspecting a relative position and/or relative alignment of a screen-printed workpiece on a workpiece carrier. By printing area is meant here an area within which printing processes can be carried out by the printing device. An inspection area separate from the printing area can be particularly configured for inspection processes and thus promote high process accuracy. In addition, good accessibility in the inspection area can be ensured, also for any inspections required by operating personnel.

An inspection area can, in a further preferred manner, be designed as part of the printing device and/or as part of the transport device. This results in a high degree of system integration.

According to a preferred embodiment, the printing device has a support arrangement, in particular a frame, for the printing table plate. The printing table plate can therefore be supported by the support arrangement. Such a support arrangement or such a frame can be designed, for example, by means of support feet or also by means of a support frame for supporting the printing table plate relative to a floor surface.

The printing table plate can be immobile, in particular fixed, relative to the support arrangement. In this way, a particularly robust design can be achieved with only minimal constructional effort.

Likewise, it is possible that a mobility of the printing table plate relative to the support arrangement is provided. Such a mobility can be limited to a printing area of the printing device. As mentioned above, a printing area can be understood as an area within which printing operations can be performed by the printing device. Movements of the printing table plate into positions in which no printing processes are to be carried out on the printing table plate can thus be excluded. The design effort with regard to the mobility of the printing table plate can be limited in this way. At the same time, a relatively low degree of mobility of the printing table plate ensures a minimum level of functionality.

It is also possible for the printing table plate to be movable only in the print build-up direction. Such a mobility can advantageously serve to adjust the lift-off value between the printing screen and the workpiece carrier or to adjust the distance between a lower side of the printing screen and an upper side of a workpiece or a printed material.

In this context, the term "lift-off" refers to the distance between the printing screen and the workpiece carrier on which a workpiece or printed material can be produced in layers. By changing the lift-off, the distance between the underside of the printing screen and the upper side or upper edge of a workpiece or printed material can be kept constant.

By fixing the printing table plate relative to the support arrangement or by limiting the mobility of the printing table plate to a printing area, it is also possible to avoid possible movements of the printing table plate into a drying device. Temperature loads on the printing table plate and any drive mechanisms can be reliably reduced or completely avoided in this way.

According to a further embodiment, the printing table plate can be designed as a sliding plate, in particular an exchangeable sliding plate. In particular, two printing table plates of the printing device can be designed as sliding plates, especially interchangeable sliding plates. Accordingly, between two different printing processes, the respective desired printing table plate can be brought into printing position by shifting operations. Accordingly, the printing table plate can also be moved beyond the printing area and/or up to an inspection area located outside the printing area.

According to a further embodiment of the apparatus according to the invention, the printing device has an upper printing mechanism. Such an upper printing mechanism can be equipped in particular with a printing and/or flood doctor blade. Likewise, the upper printing mechanism may have a printing screen and/or a screen receptacle and/or an upper mechanism frame. A printing paste can thus be applied to the respective printing blank or further printing paste layers can be applied to the workpiece or printed material via the upper printing mechanism.

In a preferred manner, the upper printing mechanism and/or the printing screen can be arranged movably relative to the printing table plate and/or relative to the support arrangement of the printing table plate. Accordingly, for example, the entire upper printing mechanism together with the printing screen and possibly other components can be arranged movably. Likewise, a movability of the printing screen can be provided within the upper printing mechanism, i.e., for example, relative to an upper mechanism frame. A movability described above can be used for adjustment for subsequent printing operations and thus improve manufacturing flexibility and manufacturing accuracy.

Likewise, the upper printing mechanism and/or the printing screen can be arranged immovably relative to the printing table plate and/or relative to the support arrangement of the printing table plate. This results in a particularly robust design. An immovable arrangement of the upper printing mechanism and/or the printing screen is particularly advantageous if the printing table plate is movable relative to the support arrangement in order to ensure relative movability between the printing table plate and the upper mechanism and/or printing screen.

Furthermore, it is possible that a mobility of the upper printing mechanism and/or the printing screen relative to the support arrangement and/or relative to the printing table plate is limited to a printing area of the printing device. Such an arrangement can be advantageous in particular if the printing table plate is immovable relative to the support arrangement, so that a relative movability between the upper printing mechanism and printing table plate or a relative movability between the printing screen and printing table plate can be ensured, respectively, as mentioned above. If the printing screen is movable relative to the printing table plate, the printing screen can be movable in particular within the upper printing mechanism. In particular, a movability can be limited to a printing area.

In a further preferred manner, the printing device can be configured and/or designed for fine adjustment.

Fine adjustment in this context means an adjustment with an accuracy tolerance of +/−10 μm regarding the position and/or up to +/−0.05° regarding the alignment or rotational position.

Likewise, fine adjustment can in the present case be understood as an adjustment with an accuracy tolerance of +/−5 μm regarding the position and/or of up to +/−0.03° regarding the alignment or rotational position.

Likewise, fine adjustment can in the present case be understood as an adjustment with an accuracy tolerance of +/−2 μm regarding the position and/or of up to +/−0.02° regarding the alignment or rotational position.

Likewise, fine adjustment can in the present case be understood as an adjustment with an accuracy tolerance of +/−1 μm regarding the position and/or of up to +/−0.01° regarding the alignment or rotational position.

Likewise, fine adjustment can in the present case be understood as an adjustment with an accuracy tolerance of +/−0.5 μm regarding the position and/or of up to +/−0.005° regarding the alignment or rotational position.

The accuracy tolerances mentioned above regarding the fine adjustment can refer to all types of fine adjustment mentioned below and/or the respective actuators required for this purpose.

In a preferred manner, the printing device can be configured and/or designed for fine adjustment between two successive printing processes for a screen-printed workpiece and/or for fine adjustment between the application of successive printing layers or print layers for a screen-printed workpiece. The process and/or workpiece accuracy can be increased in this way.

A fine adjustment can preferably be the adjustment of the relative position and/or relative alignment, in particular rotational position alignment, between the printing table plate and the upper printing mechanism or between the printing table plate and the printing screen, respectively. Likewise, a fine adjustment can be the adjustment of the relative position and/or relative orientation, in particular rotational position orientation, between the workpiece carrier and the upper printing mechanism and/or between the workpiece carrier and the printing screen. The repeatability for printing successive print layers or print deposits can be further improved in this way. In addition, fine adjustment can be used to produce more complex structures or geometries. One actuator or even a plurality of actuators can be provided for fine adjustment.

According to a further preferred embodiment, the upper printing mechanism and/or the printing screen can be moved relative to the support arrangement and/or relative to the printing table plate in the direction transverse to the print build-up direction for fine positioning. It can also be provided that the upper printing mechanism and/or the printing screen can be rotated about an axis of rotation running in the print build-up direction for fine alignment adjustment, in particular fine rotary position adjustment. At least one adjusting device, preferably a plurality of adjusting devices, can be provided for fine adjustment of the position and/or alignment of the upper printing mechanism and/or the pressure screen, in particular fine adjustment of the rotational position.

The print build-up direction is a direction in which the respective print layers are arranged consecutively. The print build-up direction is preferably also referred to as the Z-axis. The directions transverse to the print build direction are accordingly also referred to as the X-axis and Y-axis, respectively. A fine positional adjustment in the direction transverse to the print build-up direction accordingly enables a translational movement of the upper printing mechanism and/or the printing screen, in particular relative to the support arrangement and/or relative to the printing table plate. By rotating the upper printing mechanism and/or the printing screen about an axis of rotation running in the print build-up direction, which can be a Z-axis, it is also possible to align the upper printing mechanism and/or the printing screen.

According to a further preferred embodiment, the printing table plate can be moved relative to the support arrangement in a direction transverse to the print build-up direction for fine positioning. Likewise, the printing table plate can be rotated about an axis of rotation running in the print build-up direction for fine adjustment of the alignment, in particular fine adjustment of the rotational position. Consequently, instead of the movement or rotation of the upper printing mechanism and/or the printing screen for positional fine adjustment, there can also be a corresponding movement or alignment of the printing table plate. In particular, the printing table plate and thus also the workpiece carrier arranged on the printing table plate can be translationally moved and/or rotated in space.

Preferably, at least one actuator can be provided for fine adjustment of the position and/or alignment of the printing table plate. Likewise, several actuators can be provided, for example, an actuator for each axis of movement. Finally, it is also possible for both the printing table plate and the upper printing mechanism or the printing screen to be arranged so that they can be moved or rotated for fine adjustment of position and/or alignment.

The possibilities of positional and/or alignment fine adjustment can further increase the manufacturing precision. Due to the detachment of the workpiece carrier from the printing table plate in the course of the screen printing process, a recurring positioning of the workpiece carrier on the printing table plate is required. On the one hand, precise positioning or alignment of the workpiece carrier on the printing table plate can already ensure a high degree of accuracy in the screen printing process. The possibility of fine adjustment of the position and/or alignment of the upper printing mechanism, the printing screen and/or the printing table plate can further improve production flexibility and/or production accuracy.

In a further preferred manner, the upper printing mechanism and/or the printing screen can be moved relative to the support arrangement and/or relative to the printing table plate in a print build-up direction in order to set a lift-off height. This in turn can further improve manufacturing flexibility and/or manufacturing accuracy. Likewise, the printing table plate can also be movable relative to the support arrangement and/or relative to the upper printing mechanism and/or relative to the printing screen in a print build-up direction for setting a lift-off height, as mentioned above with regard to the possibility of the movable arrangement of the printing table plate. At least one adjusting device can be provided for adjusting a lift-off height. In particular, an adjusting device for fine adjustment of the lift-off height can be provided.

According to a further preferred embodiment, at least one position detection device is provided for a screen-printed workpiece and/or for a workpiece carrier and/or for the printing table plate. It is also possible for a plurality of position detection devices to be provided, in particular different position detection devices for detecting the position of different components or for covering different detection areas.

In a preferred manner, a positioning device of the printing table plate and/or a positioning device of the upper printing mechanism can be set up to carry out a fine positioning and/or alignment adjustment as a function of a position detection by a position detection device. A control loop can be implemented which enables a positional or alignment fine adjustment with particularly high accuracy.

According to a preferred embodiment, one or the position detection device can be configured to detect the position and/or orientation of a screen-printed workpiece and/or the workpiece carrier in space and/or relative to the printing table plate and/or relative to a support arrangement for the printing table plate and/or relative to an upper printing mechanism. Similarly, one or the position detecting device may be arranged to detect the position and/or orientation of the printing table plate relative to the support arrangement. Accordingly, a control loop can be implemented with regard to the absolute position of the printing table plate in space or relative to the support arrangement.

According to a preferred embodiment, a position detection device can be configured to detect the position and/or orientation of a screen-printed workpiece relative to the workpiece carrier arranged below it. The process and/or workpiece accuracy can be further improved thereby.

A position detection device can also be configured to detect the position of a workpiece carrier by means of at least one marking, in particular by means of at least two markings, on the workpiece carrier. This can be done with little effort and relatively high accuracy.

Furthermore, a position detection device for position detection can be designed within a printing range and/or arranged within a printing range. This allows a high level of process and system integration to be achieved.

Likewise, a position detection device for position detection can be designed outside a printing area, in particular inside an inspection area arranged outside the printing area. A position detection device can also be arranged outside the printing area and/or inside the inspection area. This avoids restrictions on installation space and ensures good overall accessibility and visibility for operating personnel.

In a further preferred manner, the position detection device can have at least one camera, in particular a camera arranged below or above the printing table plate. The printing table plate can thus be arranged between the camera and the printing upper unit. Furthermore, the position detection device can be configured to detect the coverage of at least one opening in the printing table plate by the workpiece carrier. Accordingly, the printing table plate can be equipped with defined openings, for example circular openings, which are partially covered by a workpiece carrier when positioned on the printing table plate. The dimension and shape of the coverage of these openings by the printing table plate can be detected by a camera and conclusions can be drawn about the position of the workpiece carrier on the printing table plate. A corresponding camera can also be arranged above the printing table plate, for example, on the upper printing mechanism.

It is also possible for the position detection device to be configured to detect the position of the workpiece carrier in a position spaced apart from the printing table plate. The position detection of the workpiece carrier in a position spaced from the printing table plate can serve in particular to initiate a handling process. Thus, by means of the position detection, a positioning and/or handling device can realize a contacting or gripping of the workpiece carrier in a targeted manner or with a high degree of certainty and subsequently carry out a repositioning on the printing table plate or initiate a targeted transport or conveyance up to the printing table plate. Likewise, when the position and/or orientation of the workpiece carrier relative to the printing table plate is detected, the position detection device can initiate handling and/or conveying of the workpiece carrier away from the printing table plate. The degree of automation can be further increased in this manner, which can further improve the overall productivity of the device. Finally, different position detection devices can be provided for different detection functions, for example in the form of multiple cameras or camera systems.

According to a further preferred embodiment, a position detection device for a printing screen can also be provided, in particular for detecting the position and/or orientation of a printing screen in space and/or relative to an upper printing mechanism and/or relative to the upper mechanism frame and/or relative to the printing table plate and/or relative to a support arrangement for the printing table plate.

In a further preferred embodiment, a height detection device can be provided, in particular a height detection device for a screen-printed workpiece or for a printed material. Such a height detection device can detect the current build-up height of a screen-printed workpiece positioned on the workpiece carrier and/or the printing table. A lift-off height can be set as a function of the height detection. The height detection can be carried out selectively at a representative position of the screen-printed workpiece or the printed material. The height detection device can also be formed by a camera system. In particular, the height detection device can be designed as a unit together with the position detection device.

According to a further preferred embodiment, the printing table plate can be designed for temporary fixing of the workpiece carrier, in particular for temporary fixing in a defined and/or aligned position on the printing table plate. The printing table plate can thus ensure that the position of the workpiece carrier for a printing process is reliably maintained. At the same time, the temporary fixability or detachability of the workpiece carrier from the printing table plate ensures a sufficiently high degree of flexibility, in particular for loading the printing table plate with a plurality of workpiece carriers during the production process.

The printing table plate can, for example, be a perforated plate, in particular a perforated plate for vacuum fixing of the workpiece carrier. Such a design ensures precise and secure fixing of the workpiece carrier on the printing table plate with very little effort. At the same time, vacuum fixing enables the workpiece carrier to be easily detached from the printing table plate by releasing a generated vacuum for the purpose of moving or transporting the workpiece carrier to a subsequent process step.

The printing table plate can in particular be a dimensionally stable or rigid plate. The printing table plate can be, for example, 1 to 10 cm thick, preferably 2 cm to 8 cm or 3 cm to 7 cm thick. In particular, the printing table plate can have a thickness of about 5 cm. The printing table plate can be made of a wear-resistant material, in particular a metal material.

The printing table plate can be designed in particular as a printing table plate with multiple printing blanks. In this context, a printing blank is to be understood as the area that can be printed on by means of the printing device.

Preferably, the printing device can have a plurality of printing table plates. This means that different printing table plates can be used alternately for a print, which can further reduce downtimes.

According to a further advantageous embodiment, the workpiece carrier can be made of a temperature-resistant material and/or be designed as an aluminum plate, in particular as an aluminum plate anodized on both sides. The workpiece carrier can also be formed as an aluminum plate in sections and consist of a different material in other sections. It is also possible for the workpiece carrier to be made at least in sections from a ceramic material. Workpiece carriers of this type have only a slight tendency to deformation, so that a high degree of operational reliability can be ensured for the screen-printed workpieces by any drying processes.

In a further preferred manner, the workpiece carrier can have a thickness of 1 mm to 4 mm, preferably of 1.5 mm to 3 mm, in particular of 2 mm to 2.5 mm or of about 2 mm. On the one hand, such a workpiece carrier exhibits sufficient dimensional stability and thus durability. On the other hand, such dimensioned workpiece carriers are sufficiently light to be positioned by a handling device with only little effort and with sufficient accuracy.

In a further preferred manner, the apparatus and/or the printing device of the device can have a screen changing device, in particular for automated screen changing. Such a screen changing device can advantageously remove an existing screen from a screen receptacle of the upper printing mechanism and replace it with another screen. For this purpose, the screen changing device can be equipped with a magazine for storing a plurality of printing screens.

In a further preferred manner, the apparatus can have several devices that can be connected modularly to form an apparatus system. In particular, multiple printing devices and/or multiple drying devices may be provided. Likewise, multiple storage devices can be provided so that the overall productivity and/or flexibility of the apparatus can be further improved.

Further preferably, the printing, drying and/or storage devices can be connected modularly to form an apparatus system. In particular, several printing devices and/or several drying devices and/or several storage devices can be connected modularly to form an apparatus system. In this way, adaptation to the respective production requirements can be carried out in a particularly advantageous manner without the need for a completely new design.

In an already configured apparatus with a printing device, a drying device and/or a storage device, an additional printing device or an additional drying device or also an additional storage device can be arranged or connected in a modular manner in an advantageous manner in order to increase the capacities and/or expand the functionalities if necessary. The overall flexibility is improved in this way.

A further independent aspect of the present invention relates to an apparatus for producing three-dimensional screen-printed workpieces, in particular a 3D screen printing machine, with at least one printing device for the layer-by-layer production of at least one screen-printed workpiece in a plurality of printing operations, with at least one drying device for a screen-printed workpiece, and with at least one transport circuit for the automated transport of the at least one workpiece carrier.

A still further independent aspect of the present invention relates to an apparatus for producing three-dimensional screen-printed workpieces, in particular a 3D screen printing machine, with at least one printing device for the layer-by-layer production of at least one screen-printed workpiece in a plurality of printing operations and with at least one workpiece carrier for at least one screen-printed workpiece, wherein the printing device is equipped with at least one printing table plate which is designed separately from the workpiece carrier and on which the workpiece carrier can be positioned in order to carry out a printing process, and wherein the workpiece carrier is, between two successive printing processes for a screen-printed workpiece, detachable from the printing table plate in order to dry the screen-printed workpiece.

A still further independent aspect of the present invention relates to an apparatus for producing three-dimensional screen-printed workpieces, in particular a 3D screen printing machine, having a printing device for the layer-by-layer production of at least one screen-printed workpiece in a plurality of printing operations, with at least one workpiece carrier for at least one screen-printed workpiece and with at least one drying device for a screen-printed workpiece, wherein the printing device has at least one printing table plate, which is formed separately from the workpiece carrier and on which the workpiece carrier can be positioned for carrying out a printing process, and wherein the workpiece carrier can be moved through the drying device independently of the printing table plate.

A still further independent aspect of the present invention relates to an apparatus for producing three-dimensional screen-printing workpieces, in particular a 3D screen-printing machine, with a printing device for the layer-by-layer production of at least one screen-printing workpiece in a plurality of printing operations and with at least one workpiece carrier for at least one screen-printing workpiece, wherein the printing device comprises at least one printing table plate, which is designed separately from the workpiece carrier and on which the workpiece carrier can be positioned in order to carry out a printing process, and an upper printing mechanism with a printing screen, the printing device being designed for fine adjustment and the fine adjustment comprising the adjustment of the relative position and/or relative alignment between the printing table plate and the printing screen.

For example, the printing screen can be moved within the upper printing mechanism or relative to other components of the upper printing mechanism and/or the entire upper printing mechanism including the printing screen. Likewise, a movement of the printing table plate for adjusting the relative position and/or relative orientation is possible. This also applies to the independent aspects of the present invention described below.

A still further independent aspect of the present invention relates to an apparatus for producing three-dimensional screen-printing workpieces, in particular a 3D screen-printing machine, with a printing device for the layer-by-layer production of at least one screen-printing workpiece in a plurality of printing operations and with at least one workpiece carrier for at least one screen-printing workpiece, wherein the printing device comprises at least one printing table plate, which is designed separately from the workpiece carrier and on which the workpiece carrier can be positioned in order to carry out a printing operation, and an upper printing mechanism with a printing screen, the printing device being designed for fine adjustment and the fine adjustment comprising the adjustment of the relative position and/or relative alignment between the workpiece carrier and the printing screen.

A still further independent aspect of the present invention relates to an apparatus for producing three-dimensional screen-printed workpieces, in particular a 3D screen printing machine, with a printing device for the layer-by-layer production of at least one screen-printed workpiece in a plurality of printing operations and with at least one workpiece carrier for at least one screen-printed workpiece, wherein the printing device comprises at least one printing table plate, which is designed separately from the workpiece carrier and on which the workpiece carrier can be positioned in order to carry out a printing operation, and an upper printing mechanism having a printing screen and a position detection device for detecting the position of the workpiece carrier, wherein the printing device is configured for fine adjustment and the fine adjustment comprising the detection of the position of the workpiece carrier by the position detection device and the adjustment of the relative position and/or relative alignment between the workpiece carrier and the printing screen dependent on a position detection.

A still further independent aspect of the present invention relates to an apparatus for producing three-dimensional screen-printed workpieces, in particular a 3D screen printing machine, with at least one printing table plate, in particular for a screen-printed workpiece and/or for a workpiece carrier, with a printing screen, and with an adjusting device for the printing screen, the adjusting device being configured for fine positional adjustment of the printing screen in directions transverse to a print build-up direction.

A still further independent aspect of the present invention relates to an apparatus for producing three-dimensional screen-printed workpieces, in particular a 3D screen printing machine, with a printing table plate, in particular for a screen-printed workpiece and/or for a workpiece carrier, with a printing screen, with an adjusting device for the printing screen and with a position detection device for a screen-printed workpiece and/or for a workpiece carrier, the adjusting device being configured to carry out a positional and/or alignment fine adjustment of the printing screen dependent on a position detection by the position detection device.

A still further independent aspect of the present invention relates to an apparatus for producing three-dimensional screen-printed workpieces, in particular a 3D screen printing machine, with a printing device for producing at least one screen-printed workpiece layer-by-layer in a plurality of printing operations and with a plurality of workpiece carriers which can be positioned within the printing device in order to carry out a printing operation, wherein at least one of the workpiece carriers is marked individually and/or traceably.

A still further independent aspect of the present invention relates to an apparatus for producing three-dimensional screen-printed workpieces, in particular a 3D screen printing machine, with at least one printing table plate, in particular for a screen-printed workpiece and/or for a workpiece carrier, and with a support arrangement for the printing table plate, the printing table plate being immovable relative to the support arrangement or a movability of the printing table plate relative to the support arrangement being limited to a printing area.

The devices described above according to the further independent aspects can be further formed with any of the details disclosed above and below.

Another aspect of the present invention relates to a method for producing three-dimensional screen-printed workpieces, in particular using an apparatus described above.

In the method according to the invention, a screen-printed workpiece is produced layer by layer in a printing device in several printing processes and the screen-printed workpiece is guided through a drying device for the continuous drying passage between two successive printing processes. This allows an overall continuous production process for a plurality of screen-printed workpieces or with a plurality of workpiece carriers on which screen-printed workpieces can be arranged. Both printing and drying can be carried out essentially uninterrupted by a continuous drying passage, which can increase the overall productivity of the apparatus.

Another independent aspect of the present invention relates to a method for producing three-dimensional screen-printed workpieces, in particular using an apparatus described above, in which at least one workpiece carrier is provided for at least one screen-printed workpiece and a screen-printed workpiece is produced in layers on the workpiece carrier in a printing device in several printing processes. In this process, the workpiece carrier is positioned on a printing table plate of the printing device, which is formed separately from the workpiece carrier, in order to carry out a printing process, and between two successive printing processes for a screen-printed workpiece, the workpiece carrier is removed from the printing table plate in order to dry the screen-printed workpiece.

To completely produce a screen-printed workpiece, the respective workpiece carrier is thus positioned several times on the printing table plate and removed from it again. This means that the workpiece carrier is repositioned on the printing table plate again and again. In this way, the printing table plate can remain within the printing device. The printing table plate can thus be loaded by a plurality of workpiece carriers, so that the utilization of the printing device can be improved. In addition, the respective workpiece carrier can be, independently of the printing table plate, conveyed to a drying device for drying. The printing table plate itself is thus not subjected to any or only low temperature loads.

According to a preferred embodiment of the methods described above, several printing screens are used in several printing operations to produce the screen-printed workpiece, with a test print preferably being made on an unprinted workpiece carrier immediately after a screen change. If faulty prints occur as a result of the screen change, this does not affect previously printed layers. Instead, faulty printing is immediately detected on the unprinted workpiece carrier so that countermeasures or corrections can be taken. Only when correct printing is ensured by a new screen, the latter can be used for printing further layers on already partially produced screen-printed workpieces.

The details described above with respect to the apparatus also apply in the same way to the methods according to the invention.

BRIEF DESCRIPTION OF THE DRAWINGS

In the following, the invention is described by way of example on the basis of advantageous embodiments with reference to the accompanying figures. It is shown in.

DETAILED DESCRIPTION

Figure 1:
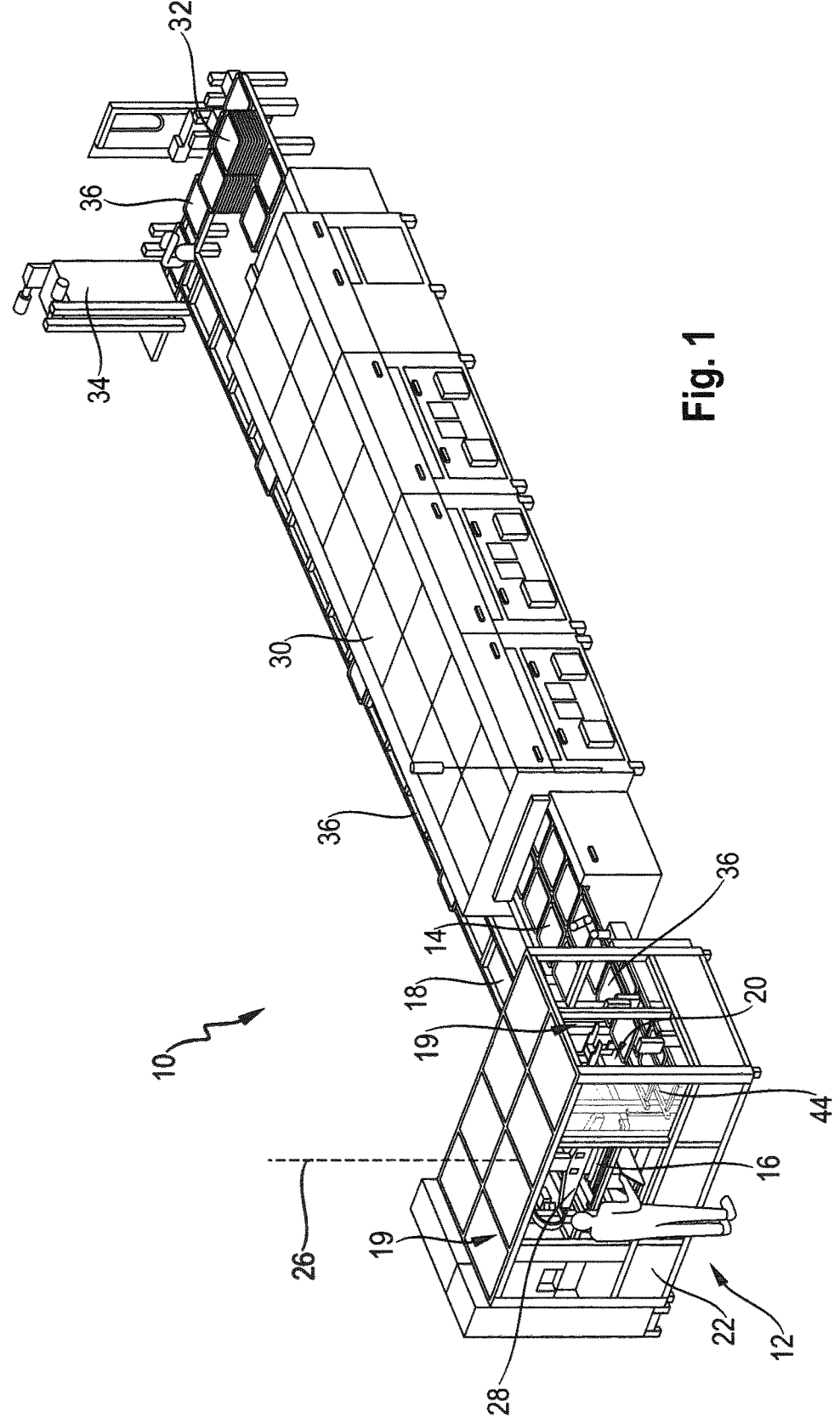
FIG. 1 a perspective view of an apparatus according to the invention according to one embodiment, FIG. 2 a top view of the apparatus of FIG. 1, FIG. 3 a schematic top view of the apparatus of FIG. 1 showing an upper transport plane, FIG. 4 a schematic top view of the apparatus of FIG. 1 showing a lower transport plane.
Figure 2:
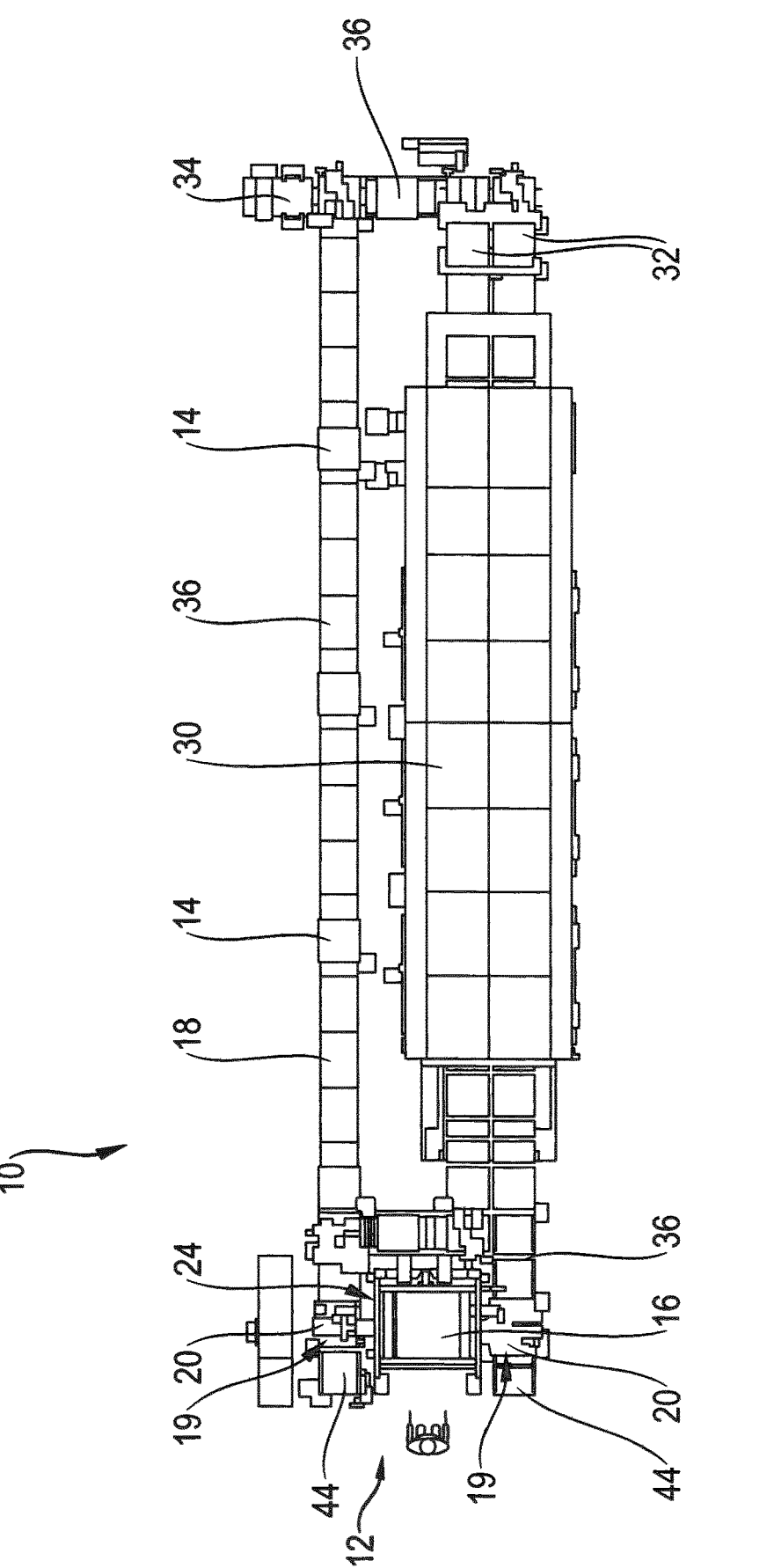
Figure 3:
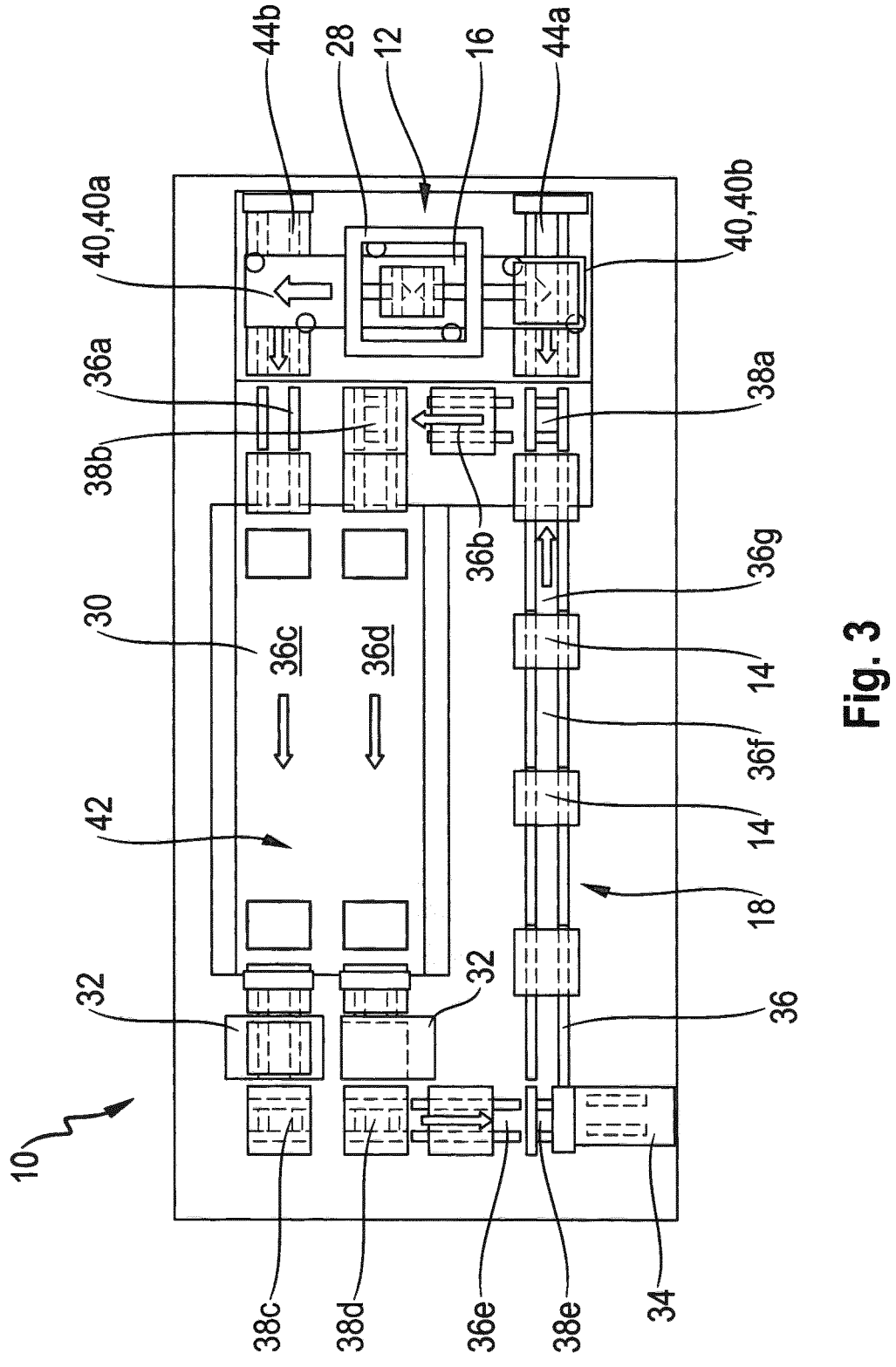
Figure 4:
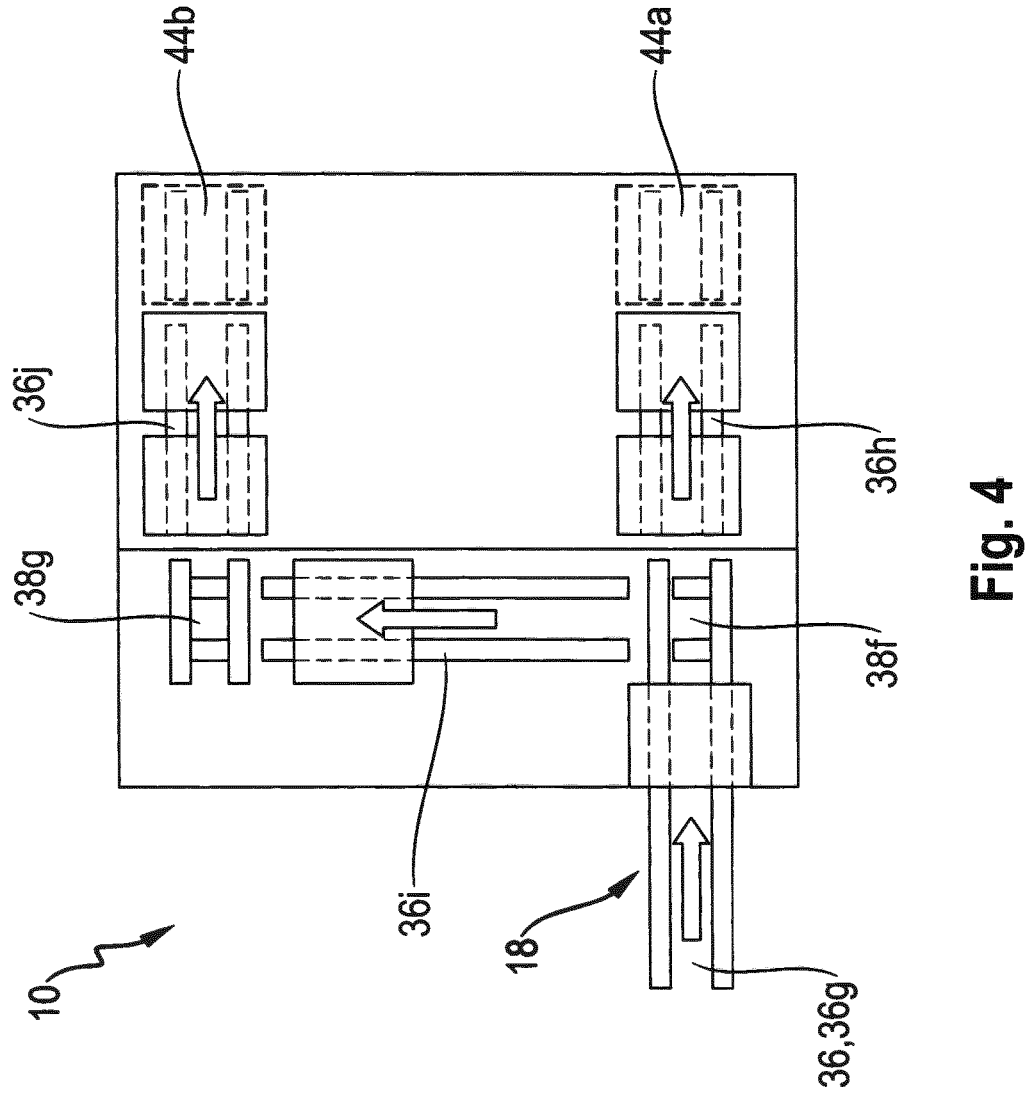

FIG. 1 shows a perspective view of an apparatus 10 for producing three-dimensional screen-printed workpieces according to an embodiment of the invention. FIG. 2 shows a top view of the apparatus 10 of FIG. 1. FIGS. 3 and 4 schematically show a top view of the apparatus 10 with illustration of different transport planes.

The apparatus 10 comprises a printing device 12 for the layer-by-layer production of at least one screen-printed workpiece in several printing operations. The printing device 12 may be a so-called screen printer. Furthermore, the apparatus 10 comprises a plurality of workpiece carriers 14. The workpiece carriers 14 are designed for at least one screen-printed workpiece, preferably for a plurality of screen-printed workpieces. Accordingly, a single screen-printed workpiece or also a plurality of screen-printed workpieces can be produced layer by layer on a single workpiece carrier 14.

Furthermore, the printing device 12 has at least one printing table plate 16 formed separately from the workpiece carrier 14. Two or more printing table plates 16 can also be provided in the printing device 12. In the case of two or more printing table plates 16, these can each be designed as an interchangeable sliding table. Also in the case of one printing table plate 16, this may be designed as an interchangeable sliding table.

The workpiece carrier 14 can be positioned on the printing table plate 16 for carrying out a printing process. Between two successive printing operations, the respective workpiece carrier 14 may be detachable from the printing table plate 16 for drying the screen-printed workpiece.

Accordingly, the apparatus 10 may be designed to allow each workpiece carrier 14 to be detachable from the printing table plate 16 between two successive printing operations for drying the screen-printed workpiece thereon. Thus, to produce a single screen-printed workpiece, the respective workpiece carrier 14 is positioned on and removed from the printing table plate 16 several times. The utilization of the printing device 12 can be advantageously improved in this way. In addition, the screen-printed workpiece or the printed material can remain on the respective workpiece carrier 14 between different printing processes, so that the risk of damage is reduced.

The apparatus 10 may further comprise a transport device 18 for the automated transport of at least one workpiece carrier 14, in particular for a plurality of workpiece carriers 14. The transport device 18 is designed as a transport circuit for the automated transport of the at least one workpiece carrier 14, preferably for a plurality of workpiece carriers 14. In particular, the transport device 18 is designed for automated transport in a circuit between the printing device 12 and at least one position spaced apart from the printing device 12 and/or the printing table plate 16.

The transport device 18 can be of multi-lane design at least in sections and/or of single-lane design at least in sections, which will be explained in more detail with reference to FIGS. 3 and 4. The transport device 18 is formed at least in sections by a conveyor means, in particular a belt conveyor. Different transport sections of the transport device 18 can run at an angle to one another. Corner transfer units can be provided for this purpose.

The apparatus 10 may further be equipped with a positioning and/or handling device 20, by means of which a workpiece carrier 14 can be positioned on the printing table plate 16 in an automated and/or defined manner. The positioning and/or handling device 20 can be designed as part of the transport device 18.

A positioning device 20 can, for example, have a conveyor, in particular a belt conveyor. Such a conveyor means can extend into the printing table plate 16 and/or be recessed into the printing table plate 16 and/or be lowerable and/or raisable relative to the printing table plate 16. In this way, a workpiece carrier 14 can be conveyed up to above the printing table plate 16 and then set down in a suitable manner and raised again and conveyed away.

A handling device, which is not shown in more detail here, can be a pick-and-place device or a handling robot, for example. In particular, a handling device can contact a workpiece carrier 14 from an area upstream of the printing device 12, lift it and then position it on the printing table plate 16 of the printing device. Following a printing process, the handling device can lift the respective workpiece carrier off the printing table plate 16 again and transport it away from the printing device 12.

The positioning and/or handling device 20 can also be designed to detect the position of the workpiece carrier 14. For this purpose, a camera system 19 or the like can be provided on the positioning and/or handling device 20, for example, by means of which the workpiece carrier 14 can be detected before contact is made or before it is lifted. By such a position detection of the workpiece carrier 14, in particular the contacting or the lifting by conveyor belts or the gripping of the workpiece carrier 14 by a handling device is simplified or the transport and/or handling safety is increased. Such a position detection of the workpiece carrier 14 can be carried out in particular in an inspection area, which will be discussed below.

Furthermore, an alignment device can also be provided, by means of which the workpiece carrier 14 can be aligned and/or positioned in a defined manner on the printing table plate 16. The alignment device may preferably be the positioning and/or handling device 20. Likewise, the alignment device can be formed by a mechanical positioning element not shown in more detail here and/or by a stop not shown in more detail here.

The printing table plate 16 can be designed for temporary fixing of the workpiece carrier 14. For this purpose, the printing table plate 16 can be designed, for example, as a perforated plate, in particular as a perforated plate for vacuum fixing of the workpiece carrier 14.

The printing device 12 may further comprise a support arrangement 22 for the printing table plate 16. The printing table plate 16 is thus supported by the support arrangement 22. Thereby, the printing table plate 16 may be immovable relative to the support arrangement 22.

Likewise, a movability of the printing table plate 16 can be provided. A movability of the printing table plate 16 relative to the support arrangement 22 can be limited to a printing area 24 of the printing device 12 and/or be provided for the fine adjustment of the position or alignment of the printing table plate 16. This may be a fine positional adjustment relative to the support arrangement 22 in a direction transverse to the print build-up direction 26 and/or a fine alignment adjustment about an axis of rotation extending in the print build-up direction 26. The print build-up direction 26 or the axis of rotation running in the print build-up direction 26 runs vertically, as shown in FIG. 1.

Furthermore, it is possible that a movability of the printing table plate 16 relative to the support arrangement 22 extends beyond a printing area 24 of the printing device 12. However, such movability may be limited to at least a housing and/or an enclosure of the printing device 12. In particular, the movability of the printing table plate 16 relative to the support arrangement 22 may be limited to areas outside of a drying device, which will be described in further detail below. Likewise, the movability of the printing table plate 16 relative to the support arrangement 22 may be limited to an inspection area, which will be described in more detail below.

Further, movability of the printing table plate 16 in the height direction along the print build-up direction 26 may be provided to adjust the lift-off height for subsequent printing operations.

The printing device 12 may further include an upper printing mechanism 28. The upper printing mechanism 28 may include a printing and or flood doctor blade, which is not shown in more detail here. Likewise, the upper printing mechanism 28 may be equipped with at least one printing screen and/or screen receptacle, which is also not shown in more detail here.

The upper printing mechanism 28 or a frame of the upper printing mechanism 28 may be immovable relative to the printing table plate 16 and/or relative to the support arrangement 22. On the other hand, a screen receptacle of the upper printing mechanism 28 may be movable relative to a frame of the upper printing mechanism 28 and/or relative to the printing table plate 16 and/or relative to the support arrangement 22. Such movability of the screen receptacle may be limited to a printing area 24 of the printing device 12. A corresponding movability of the screen receptacle may be provided for fine adjustment of position or alignment, respectively. This is particularly advantageous if the printing table plate 16 is arranged immovably relative to the support arrangement 22.

Likewise, the screen holder together with the printing screen can be moved along the printing build-up direction 26 in order to adjust the lift-off value for subsequent printing processes. A lifting mechanism not shown in more detail can be provided for this purpose. This is advantageous if the printing table plate 16 is arranged immovably along the print build direction 26.

Furthermore, in order to adjust the lift-off value, it is also possible to provide for movement of the entire upper printing mechanism 28 along the print build-up direction 26. This is also advantageous if the printing table plate 16 is arranged immovably along the print build-up direction 26.

Likewise, a mobility of the upper printing mechanism 28 relative to the support arrangement 22 and/or relative to the printing table plate 16 may be provided in directions transverse to the print build-up direction 26. Such movability of the entire upper printing mechanism 28 may be limited to a printing area 24 of the printing device 12. A corresponding movability of the upper printing mechanism 28 may be provided for fine adjustment of the position or alignment of the upper printing mechanism. This is again advantageous if the printing table plate 16 is arranged immovably relative to the support arrangement 20 in directions transverse to the print build-up direction 26.

Furthermore, a position detection device not shown in more detail here can be provided for a screen-printed workpiece and/or for a workpiece carrier 14 and/or for the printing table plate 16. In this case, any actuating devices of the printing table plate 16 and/or any actuating devices of the upper printing mechanism 28 can be set up to carry out a fine adjustment of position and/or alignment dependent on a position detection by the position detection device. In particular, the position detection device may perform position detection within the printing area 24. Likewise, it is possible for the position detection device to perform position detection outside of the printing area 24, for example in an inspection area. Further, multiple position detection devices may be provided. The position detection device may, for example, be formed by a camera system or the like. Such a position detection device can be configured in particular for detecting the position of workpiece carriers 14.

As can be further seen from FIGS. 1 and 2, the apparatus 10 is equipped with a drying device 30. The drying device 30 may be a drying path. The drying device 30 is arranged downstream of the printing device 12 in the longitudinal direction of the apparatus 10 and may have an active length that is variably adjustable, for example by activating and/or deactivating individual heat generating units, for example convection and/or radiant heat units, which are not shown in detail here.

In the apparatus 10 according to the present invention, the individual workpiece carriers 14 can be moved through the drying device 30 independently of the printing table plate 16. The printing table plate 16 thus does not experience any temperature load.

The drying path of the drying device 30 can be designed, in particular, for a continuous drying passage of screen-printed workpieces and/or workpiece carriers 14. In this case, the travel speed for the workpiece carriers 14 can be variably adjustable by the drying device 30.

A drying device can also be provided in which screen-printed workpieces are dried while stationary. For this purpose, workpiece carriers together with screen-printed workpieces can be moved into the drying device and out of it again in the opposite direction.

The apparatus 10 may further comprise a buffer storage 32, which may be located downstream of the drying device 30. Further drying or post-drying can take place in the buffer storage 32. The buffer storage can also be used to influence the material flow within the apparatus 10.

Furthermore, the apparatus 10 can be equipped with a storage device 34, which can be a loading and/or unloading storage device or an input and/or output storage device. Via the storage device 34, individual workpiece carriers 14 can be fed into and discharged from the transport device 18, which is designed as a transport circuit. Temporary intermediate storage of individual workpiece carriers 14 can also take place in the storage device 34. The storage device 34 can be arranged in the material flow between the drying device 30 and the printing device 12.

The printing device 12, the drying device 30, the buffer storage 32 and/or the storage device 34 can be connected modularly to form an apparatus system. Such an apparatus system may consist of a plurality of apparatuses 10 or of one apparatus 10, which has been expanded and/or reduced by individual devices or stations.

The printing device 12, the drying device 30, the buffer storage 32 and/or the storage device 34 can be suitably connected by the transport device 18 or integrated into an apparatus system. In particular, an automated transport of workpiece carriers between the printing device 12, the drying device 30, the buffer storage 32 and/or the storage device 34 can be carried out by the transport device 18, in particular along a transport circuit.

The transport of workpiece carriers 14 by the transport device 18 is now explained with reference to FIGS. 3 and 4, FIG. 3 showing a top view with illustration of an upper level of the transport device 18 and FIG. 4 showing a top view with illustration of a lower level of the transport device 18.

In particular, the transport device 18 may include a plurality of conveyor belt sections 36 and corner transfer units 38. The conveyor sections 36 can transport individual workpiece carriers 14 between different stations or devices of the apparatus 10.

As mentioned above, the printing processes take place within the printing device 12. For this purpose, the respective workpiece carriers 14 must be positioned within the printing device 12, in particular on the printing table plate 16 of the printing device 12.

After printing has been completed, the respective workpiece carrier 14 is positioned out of the printing device 12 into a placement area 40 downstream in the material flow. Placement areas 40 can be provided on both sides of the printing table plate 16. Accordingly, the workpiece carriers 14 can be conveyed away from the printing table plate 16 on both sides. Between the printing table plate 16 and the respective placement area 40, the workpiece carriers can be conveyed by a positioning device 20, which can also be formed by a conveyor belt section and forms part of the transport device 18.

An aforementioned placement area 40 can in particular also be designed as an inspection area and/or serve as an inspection area.

The respective workpiece carrier 14 is conveyed from the respective placement area 40 to the drying device 30. The workpiece carrier 14 can be conveyed from the placement area 40a along the conveyor belt section 36a to the drying device 30. Starting from the placement area 40b, the workpiece carriers are conveyed to the corner transfer unit 38a, further along the conveyor belt section 36b to the corner transfer unit 38b and then into the drying device 18. Likewise, the workpiece carriers can be conveyed further from the corner transfer unit 38b to the conveyor belt section 36a and then into the drying unit 30.

The drying path 42 runs within the drying device 30. The drying path 42 can be of two-lane design, i.e. formed by two conveyor sections 36c and 36d, in order to increase the drying capacity. After passing through the drying path 42, the respective workpiece carrier 14 reaches a buffer storage 32, in which further drying or subsequent drying can take place.

After the buffer storage 32, further conveying takes place to one of the corner transfer units 38c and 38d, respectively, and further along the conveyor line 36e to the corner transfer unit 38e.

The storage device 34 is arranged adjacent to the corner transfer unit 38e. Starting from the corner transfer unit 38e, the workpiece carriers are further conveyed along a return path which has the conveyor belt lines 36f and 36g. The conveyor belt lines 36f and 36g can merge into one another along the conveying direction, and the downstream conveyor belt line 36g can have an incline. In particular, the conveyor belt line 36g may be inclined downwardly to allow transfer of workpiece carriers from the upper level of the transport device 30 shown in FIG. 3 to a lower level of the transport device 30 shown in FIG. 4. It is also possible for both conveyor lines 36f and 36g of the return path to have a vertical inclination.

The workpiece carriers 14 pass through the conveyor belt line 36g to the corner transfer unit 38f shown in FIG. 4. Starting from the corner transfer unit 38f, the workpiece carriers 14 can be conveyed further either to the conveyor belt line 36h or to the conveyor belt line 36i.

The conveyor belt line 36h leads to the lifting device 44a, which lifts the workpiece carriers 14 to the upper level of the transport device 18. Finally, lifted workpiece carriers 14 can be conveyed further to the placement area 40b, from where loading of the printing table plate 16 by the positioning device 20 can take place.

The conveyor belt line 36i first leads to the corner transfer unit 38g and from there further along the conveyor belt line 36j to the lifting device 44b, by means of which the workpiece carriers 14 are lifted into the upper level of the transport device 18. Finally, lifted workpiece carriers 14 can be conveyed further to the placement area 40a, from where loading of the printing table plate 16 by the positioning device 20 can take place.

Instead of the corner transfer unit 38f, the corner transfer unit 38a can also be equipped with a lifting function for direct transport of the workpiece carriers 14 between the two levels of the transport device 18. This can be advantageous, in particular, if the printing device 12 is to be bridged over a distance as short as possible, for example, in order to carry out multiple drying without intermediate printing of the workpiece carrier. However, this can also be accomplished without a lifting function of the corner transfer unit 18a, as can be seen from the arrangement of the conveyor belt line 36.

The apparatus 10 described above is particularly suitable for the mass production of three-dimensional screen-printed workpieces. In particular, the apparatus 10 enables extensive or complete automation of the screen printing process. The risk of operating errors is reduced and the level of productivity can be significantly increased by means of a apparatus 10 as described above.

The invention claimed is:

1. An apparatus (10) for producing three-dimensional screen-printed workpieces with at least one printing device (12) for the layer-by-layer production of at least one screen-printed workpiece in a plurality of printing operations by transferring a powder-based suspension to a substrate through a fixed printing mask with the aid of a squeegee, and with at least one drying device (30) for the at least one screen-printed workpiece, wherein the at least one drying device (30) is designed as a drying path (42) for the continuous drying passage of the at least one screen-printed workpiece such that the at least one screen-printed workpiece is dried while continuously moving through the drying device, which allows individual layers of the at least one screen-printed workpiece to be dried between two successive printing processes.

2. The apparatus (10) according to claim 1, further comprising a workpiece carrier (14) for at least one screen-printed workpiece, wherein the at least one printing device (12) comprises at least one printing table plate (16) being formed separately from the workpiece carrier (14) and on which the workpiece carrier (14) can be positioned for carrying out a printing process, and wherein the workpiece carrier (14) is, between two successive printing processes for the at least one screen-printed workpiece, detachable from the at least one printing table plate (16) for drying the at least one screen-printed workpiece.

3. The apparatus (10) according to claim 2, further comprising a transport device (18) for the automated transport of the workpiece carrier (14), the transport device (18) having a transport circuit for the automated transport of the workpiece carrier (14) and/or being designed as a transport circuit and/or wherein the transport device (18) is configured for the automated transport in a circuit between the at least one printing device (12) and at least one position spaced apart from the at least one printing device (12) and/or the at least one printing table plate (16).

4. The apparatus (10) according to claim 3, wherein the transport device (18) and/or the transport circuit is designed to be multi-lane at least in sections and/or single-lane at least in sections and/or in that the transport device (18) is formed at least in sections by a conveying means, and/or in that the transport device (18) has a plurality of conveyor belt sections (36) running at an angle to one another and/or in that the transport device (18) has at least one corner converter (38) with conveyor belts running transversely to one another.

5. The apparatus (10) according to claim 2, further comprising a positioning and/or handling device (20) for pre-positioning the workpiece carrier (14) on the at least one printing table plate (16) with an accuracy tolerance of +/−500 μm with respect to the position and/or of up to +/−5° with respect to the orientation of the workpiece carrier (14).

6. The apparatus (10) according to claim 3, wherein the transport device (18) runs at least in sections along at least two planes and/or a lifting device (44) is provided between two planes of the transport device (18), and/or the transport device (18) is formed at least in sections with a height gradient running between two planes of the transport device (18), the height gradient being formed on a return path to the printing device (12).

7. The apparatus (10) according to claim 1, wherein the drying path (42) is designed as part of a transport device (18).

8. The apparatus (10) according to claim 2, wherein the workpiece carrier (14) can be moved through the at least one drying device (30) independently of the at least one printing table plate (16), and the workpiece carrier (14) can be moved through the at least one drying device (30) automatically and/or can be moved through the at least one drying device (30) at a variably adjustable speed.

9. The apparatus (10) according to claim 1, wherein the at least one drying device (30) is configured for drying of the at least one screen-printed workpiece by means of convection and/or thermal radiation, and/or in that the at least one drying device (30) has a plurality of convection and/or thermal radiation units and/or in that the active length of the at least one drying device (30) is variably adjustable by activating and/or deactivating at least one convection and/or thermal radiation unit.

10. The apparatus (10) according to claim 1, wherein a number of drying devices (30) is equal to or less than a number of printing devices (12), or in that a number of drying devices (30) is greater than a number of printing devices (12), and/or in that a plurality of printing devices (12) is provided, each printing device (12) being assigned at least one drying device (30) and/or each drying device (30) being assigned at least one printing device (12).

11. The apparatus (10) according to claim 1, further comprising a plurality of workpiece carriers (14), wherein the plurality of workpiece carriers can be positioned within the at least one printing device (12) for carrying out a printing process, and/or are each marked individually and/or traceably, and/or are each provided with at least one marking, the marking being electronically identifiable by RFID, optically and/or by camera, and/or are each provided with at least one marking for individual identification and/or individual tracking of the plurality workpiece carriers.

12. The apparatus (10) according to claim 1, wherein the transport device (18) leads through the at least one drying device (30) in multiple lanes and/or in the transport circuit the return from the at least one drying device (30) to the at least one printing device (12) is designed as single lane or has fewer lanes than the transport section leading through the at least one drying device (30).

13. The apparatus (10) according to claim 3, wherein the transport device (18) is designed to bridge the at least one printing device (12) and/or that the transport device (18) is designed to pass the workpiece carrier (14) through the at least one drying device (30) several times without passing through the at least one printing device (12).

14. The apparatus (10) according to claim 1, wherein a plurality of devices which can be connected modularly to form an apparatus system are provided and/or in that a plurality of printing devices (12) and/or a plurality of drying devices (30) and/or a plurality of storage devices (34) are provided, which are designed for modular arrangement and/or in that the at least one printing device (12) and/or the at least one drying device (30) and/or at least one storage device (34) can be connected modularly to form an apparatus system.

15. A method for producing three-dimensional screen-printed workpieces with the apparatus (10) according to claim 1, in which the at least one screen-printed workpiece is produced layer by layer in the at least one printing device (12) in a plurality of printing operations by transferring a powder-based suspension to a substrate through a fixed printing mask with the aid of a squeegee, and in which the at least one screen-printed workpiece is, between two successive printing operations, guided for drying through at least one drying device (18) that is designed as a drying path (42) for the continuous drying passage.

16. An apparatus (10) for producing three-dimensional screen-printed workpieces, comprising:

at least one printing device (12) for the layer-by-layer production of at least one screen-printed workpiece in a plurality of printing operations by transferring a powder-based suspension to a substrate through a fixed printing mask with the aid of a squeegee; and at least one drying device (30) for drying the at least one screen-printed workpiece, wherein the at least one drying device (30) is designed such that the at least one screen-printed workpiece is dried while moving continuously through the at least one drying device and a speed of moving of the at least one screen-printed workpiece and/or a length of the at least one drying device traversed by the at least one screen-printed workpiece is adapted to be variable to adjust a drying intensity for the at least one screen-printed workpiece between two successive printing processes.

17. The apparatus of claim 16, wherein the at least one screen-printed workpiece is carried on at least one workpiece carrier, and the at least one printing device comprises at least one printing table plate, which is formed separately from the workpiece carrier such that the workpiece carrier is detachable from the printing table plate and movable with the at least one screen-printed workpiece carrier through the at least one drying device separate from the printing table plate.

\* \* \* \* \*